United States Patent [19]

Smith

[11] Patent Number: 4,612,419

[45] Date of Patent: Sep. 16, 1986

[54] TOLL RESTRICTION CIRCUIT FOR AN ELECTRONIC TELEPHONE STATION

[75] Inventor: Louis W. Smith, St. Petersburg, Fla.

[73] Assignee: GTE Communication Systems Corp., Northlake, Ill.

[21] Appl. No.: 688,230

[22] Filed: Jan. 2, 1985

[51] Int. Cl.4 ............................................. H01M 1/66
[52] U.S. Cl. .............................. 179/90 D; 179/18 DA
[58] Field of Search .......... 179/90 D, 18 DA, 189 D, 179/90 B, 90 BD, 84 VF, 81 R

[56] References Cited

U.S. PATENT DOCUMENTS

| | | | |
|---|---|---|---|
| 4,177,358 | 12/1979 | Mason | 179/18 DA |
| 4,188,508 | 2/1980 | Rogers et al. | 179/18 DA |
| 4,234,764 | 11/1980 | Beebe | 179/90 D |
| 4,314,108 | 2/1982 | Sharvit | 179/90 D |
| 4,332,982 | 6/1982 | Thomas | 179/7.1 R |
| 4,336,422 | 6/1982 | Mellon | 179/18 DA |
| 4,358,640 | 11/1982 | Murray | 179/90 D |
| 4,425,480 | 1/1984 | Lischin | 179/90 D |
| 4,453,042 | 6/1984 | Wolf et al. | 179/84 VF |

FOREIGN PATENT DOCUMENTS 2086187  5/1982  United Kingdom ............ 179/90 D

Primary Examiner—Robert G. Lev
Attorney, Agent, or Firm—Gregg G. Hendricks

[57] ABSTRACT

A circuit which prevents a telephone station from being used for unauthorized toll calls while allowing toll calls to be made when preceded by authorized passwords. When the telephone station is in the toll restriction mode of operation a microprocessor disconnects the tone generator from the keypad and provides audible and visual error signals upon detection of operation of the "0" or "1" keypad buttons. Upon detection of simultaneous operation of the "1" and "2" keypad buttons, the microprocessor provides audible and visual signals to prompt entry of a password. If a valid password is entered, the telephone station enters the unrestricted mode of operation and the toll restriction circuit is disabled until the handset is returned to the on-hook position after termination of the subsequent toll call. Upon detection of prolonged operation of the "1" keypad button, the telephone station enters the password update mode of operation and the microprocessor provides visual and audible signals to prompt entry of the old password followed by a double entry of the new password to ensure correct entry of that new password.

21 Claims, 1 Drawing Figure

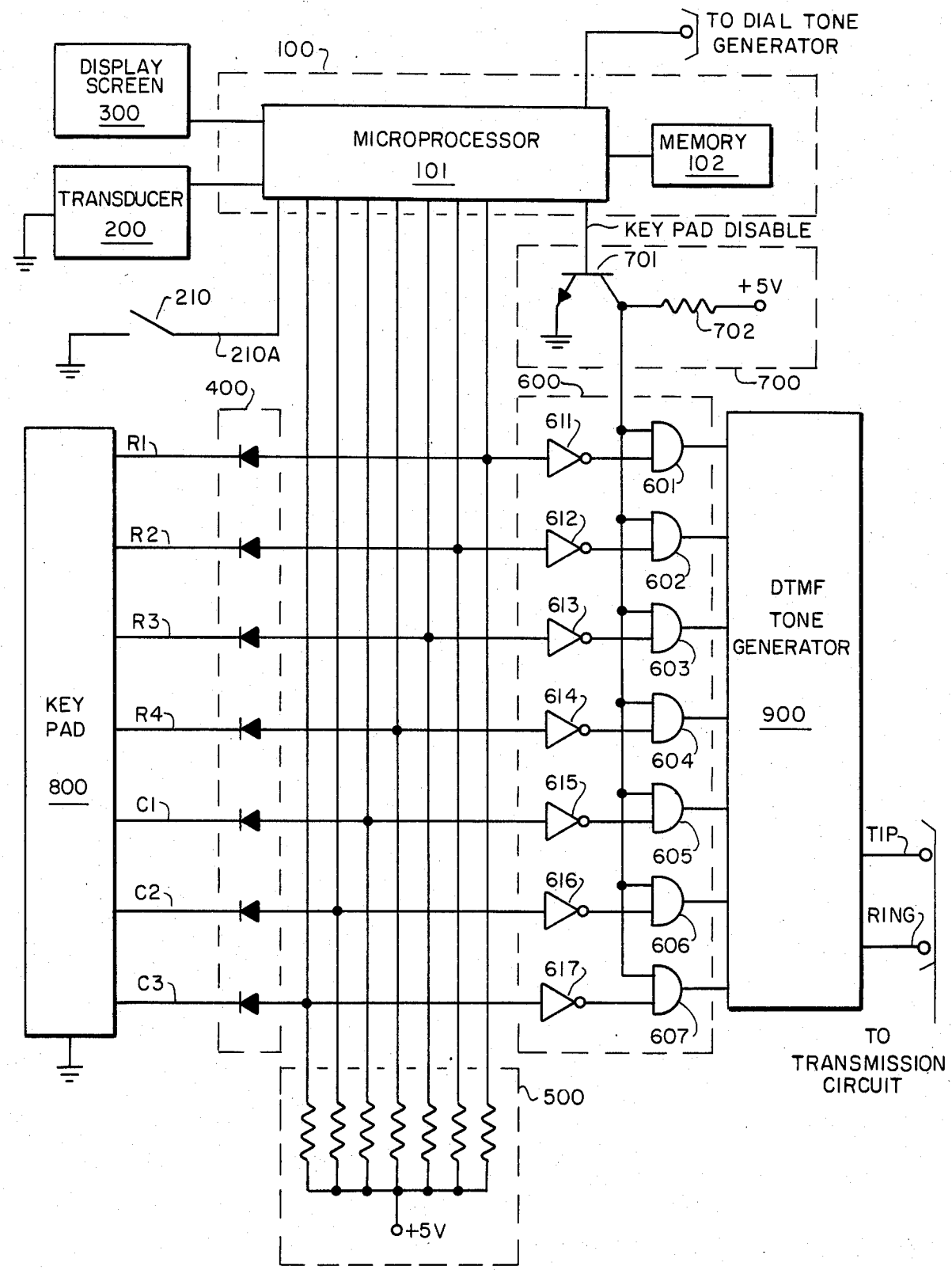

TOLL RESTRICTION CIRCUIT FOR AN ELECTRONIC TELEPHONE STATION

CROSS REFERENCE TO RELATED APPLICATION

The following U.S. patent application is related to the present invention:

U.S. patent application Ser. No. 560,694, entitled "Master Unlock Circuit For A Feature Telephone Station Including A Signaling Lock Circuit", filed on Dec. 12, 1983 in the names of L. W. Smith and J. G. Wagoner.

The inventions claimed in the present application and the related application were assigned to the same assignee.

FIELD OF THE INVENTION

The present invention relates to electronic telephone stations and more particularly to a toll restriction circuit for such electronic telephone stations.

BACKGROUND OF THE INVENTION

A novel telephone station signaling lock circuit was disclosed in U.S. Pat. No. 4,453,042 entitled "Telephone Station Signaling Lock Circuit" which issued on June 5, 1984 to A. L. Wolf and J. G. Wagoner. As disclosed in that patent, the signaling circuit was locked or disabled by a microprocessor in response to operation of a station lock pushbutton To unlock or enable the signaling circuit, the station lock pushbutton was again operated and selected keypad pushbuttons were subsequently operated. If the character signals provided by operation of these keypad pushbuttons are identical to a predetermined unlock code, the microprocessor then unlocks the telephone station. However, if the unlock code is not known, the signaling circuit of a locked telephone station can not be unlocked, even in cases of emergency.

The previously referenced copending application for a Master Unlock Circuit overcomes the limitation through a novel arrangement for a master unlock code. However, that arrangement still requires use of a station lock pushbutton. The present invention discloses a novel arrangement for restricting the telephone station to local call without the requirement of a station lock pushbutton.

SUMMARY OF THE INVENTION

In accordance with the present invention, a toll restriction is provided circuit for use in a telephone station that includes a keypad having a plurality of pushbuttons, each operable to provide a different pair of row and column signals indentifying of an associated pushbutton digit, a tone generator, operable in response to each pair of row and column signals to provide an associated pair of tone signals, and a pair of hookswitch contacts, operable to provide on-hook and off-hook signals.

The toll restriction circuit includes a microprocessor connected to the keypad and the hookswitch, a memory connected to the microprocessor and operated to store a predetermined toll call identifying digit and a toll restriction bit. The hookswitch is operated to provide an off-hook signal when a telephone call is initiated and an on-hook signal when a telephone call is terminated.

The microprocessor is operated in response to the off-hook signal and the first subsequent pushbutton digit, to retrieve the toll call identifying digit from the memory, to compare the pushbutton digit to the toll call identifying digit, and to provide an enable signal in response to miscomparison thereof. The microprocessor is further operated in response to the toll restriction bit from the memory; and it is operated in response to the toll restriction bit having first and second characteristics to provide a disable signal and the enable signals, respectively;

A gating circuit is also included and it is connected to microprocessor and further connected between the keypad and the tone generator. It is operated in response to the enable signal to electrically connect the tone generator to the keypad, whereby the tone generator is operated in response to each pair of row and column signals to provide the associated pair of tone signals.

The gating circuit means is further operated in response to the disable signal to electrically disconnect the tone generator from the keypad, whereby the row and column signals are restricted from causing the tone generator to provide associated toll call tone signals.

The microprocessor is further operated in response to the on-hook signal to cause the toll restriction bit to have a value of the first characteristic.

DESCRIPTION OF THE DRAWING

The single FIGURE of the accompanying drawing is a schematic diagram of a toll restriction circuit for an electronic telephone station in accordance with the present invention.

DESCRIPTION OF THE PREFERRED EMBODIMENT

Referring now to the accompanying drawing, the toll restriction circuit of the present invention is shown. This circuit includes processing unit 100 connected to audible transducer 200, hookswitch 210, display screen 300, diode network 400, resistor network 500, gating circuit 600 and disable circuit 700. Diode network 400 is further connected to keypad 800, and gating circuit 600 is further connected to Dual Tone Multifrequency (DTMF) tone generator 900. Tone generator 900 is connectable to an associated transmission circuit via the TIP and RING leads.

Processing unit 100 includes microprocessor 101 connected to memory 102. Diode network 400 includes seven protection diodes connected to keypad 800 via four row (R1-R4) and three column (C1-C3) leads. These diodes protect microprocessor 101 from extraneous high voltage signals applied to the row and column leads.

Keypad 800 is old and well known and includes four rows and three columns of pushbuttons. Each pushbutton causes its associated row and column leads to be connected to ground when it is operated. DTMF tone generator 900 is also old and well known and is operative to provide plurality of pairs of tones.

Resistor network 500 includes seven resistors connected to the +5 volt supply. Each resistor is further connected to an associated diode in diode network 400.

Gating circuit 600 includes seven AND gates, 601-607, connected to DTMF tone generator 900. The first input of each of these gates is connected to disable circuit 700. The second input of each of thes gates is connected to an associated inverter in inverter group 611-617. Each inverter is further connected to the junction of an associated diode and resistor in diode and resistor networks 400 and 500, respectively.

Disable circuit 700 includes transistor 701 which has its base connected to microprocessor 101, via the keypad disable lead, its emitter connected to ground, and its collector connected to the 5 volt supply via resistor 702.

Keypad 800, diode network 400, resistor network 500, gating circuit 600 and DTMF tone generator 900 operate in combination as a signaling circuit.

The toll restriction circuit of the present invention provides the means by which unauthorized personnel can be prevented from making toll calls from a telephone equipped with this circuit. However, the present invention does allow toll calls to be made by personnel who enter an authorized password before placing such a call. This circuit is appropriate for telephones used in locations susceptible to customer or employee abuse. For example, in a restaurant, a customer would be prevented from making a toll call after requesting use of a telephone to place a local call.

The toll restriction circuit of the present invention provides the associated telephone with three modes of operation; i.e., toll restriction, unrestricted and password update. In the toll restriction mode of operation, the telephone cannot be used to complete "0" (Operator), "0+" (operator assisted toll), or "1+" (direct dial toll) calls.

Under quiescent conditions a logic level 0 signal is applied to the keypad disable lead so transistor 701 is turned off. Logic level 1 signals then appear at the first input of AND gates 601-607 via resistor 702 and the +5 volt supply. If none of the pushbuttons in keypad 800 is operated, a logic level 1 signal appears at the input of each inverter in inverter group 611-617 via resistor network 500 and the +5 volt supply. Inverters 611-617 then apply logic level 0 signals to the second input of each AND gate in gating circuit 601-607. Each AND gate then applies a logic level 0 signal to DTMF tone generator 900 causing it to prevent tones from being applied to the TIP and RING leads.

When a call is to be placed, the telephone's handset is lifted and associated hookswitch contacts 210 are closed. Microprocessor 101 detects the resultant ground connection on lead 210A and causes the dial tone gererator to apply dial tone to the handset. The called telephone station is then identified by operation of selected pushbuttons.

When a pushbutton is operated, an associated one of the row leads (R1-R4) and an associated one of the column leads (C1-C3) are connected to ground. Microprocessor 101 detects these ground connections and causes the dial tone generator to remove dial tone from the handset.

Microprocessor 101 then retrieves the toll restriction word from memory. Under normal conditions this word contains a bit indicating that toll calls are to be restricted. In that case, microprocessor 101 enters the toll restriction routine and determines the digit or character represented by the first pair of row and column signals. The microprocessor then compares this pushbutton signaled digit or character with data stored in memory that represents the "0" and "1" digits.

If the pushbutton signaled digit is not a "0" or "1", a toll call or operator assisted call is not being signaled so microprocessor 101 does not disconnect DTMF tone generator 900 from keypad 800. Therefore, a logic level 0 signal remains applied to the base of transistor 701 and logic level 1 signals remain applied to the first input of AND gates 601-607.

As was previously stated, when a pushbutton is operated, an assocated one of the row leads (R1-R4) and an associated one of the colum leads (C1-C3) are connected to ground. The resultant logic level 0 signals are inverted to logic level 1 signals by an associated pair of inverters in inverter group 611-617. A logic level 1 signal then appears at the second input of an associated pair of AND gates in gating circuit 600. Consequently, each of the associated pair of AND gates applies a logic level 1 signal to DTMF tone generator 900. This tone generator then applies a corresponding pair of tones to the TIP and RING leads. Thus, the keypad signaled call is allowed to be established since the DTMF tone generator is not disconnected from the keypad.

If the first keypad signaled digit was determined to be a "0" or "1", then a toll call or operator assisted call is being attempted. Microprocessor 101 then successively applies three logic level 1 signals of predetermined duration to transducer 200. This transducer then generates three successive "beep" signals to provide an audible indication that a toll call is being restricted.

Microprocessor 101 also retrieves characters representing a "Toll Restricted" message from memory 102. These characters are then applied to display screen 300 in order to also provide a visual indication that a toll call is being restricted.

In order to actually restrict the toll call, microprocessor 101 applies a logic level 1 signal to the keypad disable lead, causing transistor 701 to turn on. Logic level 0 signals then appear at the first input of AND gates 601-607. These AND gates then apply logic level 0 signals to DTMF tone generator 900 causing it to prevent tones from being applied to the TIP and RING leads. Thus, the keypad is electrically disconnected from the DTMF tone generator.

When the handset is hung up, hookswitch contacts 210 are opened and microprocessor 101 applies a logic level 0 signal to the keypad disable lead, causing transistor 701 to turn off. Consequently, logic level 1 signals reappear at the first input of AND gates 601-607 and the keypad is electrically reconnected to the DTMF tone generator. Microprocessor 101 also removes the "Toll Restricted" message from display screen 300, and rewrites the toll restricted bit in memory 102. Thus, the toll restricted bit is reinitialized and the display screen and toll restriction circuit are reset when the handset is hung up.

In order to enter the unrestricted mode of operation, the "1" and "2" keypad buttons are depressed while the handset is still hung up or on-hook.

Microprocessor 101 detects these simultaneous digits and provides a logic level 1 signal of predetermined duration to transducer 200, causing it to provide a single "beep" signal.

Microprocessor 101 also retrieves characters re-spresentative of an "Enter Password" message from memory 102. These characters are then applied to display screen 300 which then displays the "Enter Password" message. Thus, both visual and audible prompting signals are provided in response to simultaneous operation of the "1" and "2" keypad buttons.

A four digit password is then entered via the keypad. Microprocessor 101 accumulates these digits and compares them to the password it retrieves from memory 102. If the two passwords are identical, microprocessor 101 removes the "Enter Password" message from display screen 300 and clears the toll restricted bit from memory 102. When the handset is next lifted to place a toll call, hookswitch contacts 210 close and microprocessor 101 again detects the resultant ground correction on lead 210A. Dial tone is again returned, and the "0" or "1" keypad pushbuttons are depressed. Microprocessor detects the "0" or "1" digit, removes dial tone, and retrieves the toll restriction bit. However, since this bit is reset, the toll restriction routine is not entered. Therefore, a logic level 0 signal remains applied to the keypad disable lead and DTMF tone generator 900 is not electrically disconnected from keypad 800. The toll call is then signaled via the keypad and DTMF tone generator. Thus, by clearing the toll restricted bit the toll restriction circuit is disabled since the toll restriction routine program is not entered when the toll restriction bit is reset.

Upon termination of the call, the handset is hung up or returned to the on-hook position and hookswitch contacts 210 are opened. Microprocessor 101 detects the resultant open circuit condition on lead 210A and rewrites the toll restriction bit into memory 102. Therefore, the password must be reentered each time a toll call is to be placed with the toll restriction circuit disabled.

If the keypad provided password is not identical to the one retrieved from memory 102, then microprocessor 101 successively applies three logic level 1 signals of predetermined duration to transducer 200. This transducer then generates three successive "beep" signals to provide an audible indication that an incorrect password had been entered.

In order to update the password, the "1" keypad button is depressed and held depressed for a prolonged period of time, e.g. more than one second. Microprocessor 101 detects the prolonged depression of this pushbutton via the associated row and column leads. After the minimum required predetermined time, e.g. one second, microprocessor 101 enters the password update mode and applies the "Enter Password" prompting message to display screen 300.

The four digit password is then provided via keypad 800. These four digits are accumulated by microprocessor 101 and compared to the password retrieved from memory 102. If these two passwords are not identical, microprocessor 101 again successively applies three logic level 1 signals of predetermined duration to transducer 203, causing it to provide the three "beep" audible error signal.

If the keypad provided password is identical to the password retrieved from memory 102, microprocessor 101 applies a logic level 1 signal of predetermined duration to transducer 200, causing it to provide a single audible "beep" tone. Microprocessor 101 also retrieves a "New Password" message from memory 102 and applies it to display screen 300. Thus, microprocessor 101 causes both visual and audible signals to be provided to prompt entry of the new password.

A new four digit password is then provided via keypad 800. Microprocessor 101 accumulates the four digits of the new password and applies a logic level 1 signal of predetermined duration to transducer 200, causing it to provide an audible "beep" tone. Microprocessor 101 also retrieves a "Reenter Password" message from memory 102 and applies it to display screen 300. Thus, microprocessor 101 causes both visual and audible signals to be provided to prompt reentry of the new password.

The four digit new password is then provided for a second time, via keypad 800. Microprocessor 101 also accumulates this second four digit new password and compares it to the previously accumulated four digit new password. If both entries of the new password are identical, microprocessor 101 updates the password by storing the new password in the password location of memory 102. Microprocessor 101 also clears the "Reenter Password" message from display screen 300 and applies a logic level 1 signal of predetermined direction to transducer 200. This signal causes transducer 200 to provide a single audible "beep" tone as acknowledgment that the password has been updated. Thus, in order to update the password, the new password must be entered twice as a security precaution to prevent entry of an erroneous new password.

If the two entries of the new password are not identical, microprocessor 101 successively applies three logic level 1 signals of predetermined duration to transducer 200, causing it to provide the three "beep" audible error signal. Since the "Reenter Password" message was not cleared from display screen 300, both visual and audible signals are provided to prompt reentry of the second four digit password. If the first and third entries of the new password are identical, the password is updated, the display screen is cleared and an audible "beep" tone is provided in acknowledgment that the password has been updated.

If the first and third entries of the new password are still different, the password is not updated, display screen 300 is cleared and the password update mode of operation is terminated. Further attempts can be made to update the password only after reentering the password update mode of operation by depressing the "1" keypad button for the predetermined prolonged period of time.

Thus, the toll restriction circuit of the present invention has three modes of operation. In the toll restriction mode, "0", "0+" and "1+" calls can not be made. Such calls can however be placed if the unrestricted mode of operation is accessed by using the keypad to provide a predetermined password. Also, the password update mode of operation can be utilized to change an old password to a new password.

It will be obvious to those skilled in the art that numerous modifications of the present invention can be made without departing from the spirit of the invention which shall be limited only be the scope of the claims appended hereto.

What is claimed is:

1. A toll restriction circuit for use in a telelphone station that includes a keypad having a plurality of pushbuttons, each operable to provide a different pair of row and colum signals identifying an associated pushbutton digit, a tone generator, operable in response to each pair of row and column signals to provide an associated pair of tone signals, and a pair of hookswitch contacts, operable to provide on-hook and off-hook signals, said toll restriction circuit comprising:

a miscroprocessor connected to said keypad and said hookswitch;

a memory connectd to said microprocessor and operated to store a predetermined toll call identifying digit and a toll restriction bit;

said hookswitch being operated to provide an offhook signal when a telephone call is initiated and an on-hook signal when a telphone call is terminated;

said microprocessor being operated in response to said off-hook signal and the first subsequent pushbutton digit, to retrieve said toll call indentifying digit from said memory, to compare said pushbutton digit to said toll call indentifying digit, and to provide an enable signal in response to miscomparison thereof and further operated in response to comparison thereof to retrieve said toll restriction bit from said memory; and operated in response to said toll restriction bit having first and second characteristics to provide a disable signal and said enable signal, respectively; and gating means connected to said microprocessor and further connected vetween said keypad and said tone generator, and operated in response to said enable signal to electrically connect said tone generator to said keypad, whereby said tone generator is operated in response to each pair of row and column signals to provide said associated pair of tone signals;

said gating means further operated in response to said disable signal to electrically disconnect said tone generator from said keypad, whereby said row and column signals are restricted from causing said tone generator to provide associated toll call tone signals;

said microprocessor being further operated in response to said on-hook signal to cause said toll restriction bit to have a value of said first characteristic;

said microprocessor being further operated in response to operation of said keypad in a manner different from monentary depression of a single pushbutton to provide a sensible control signal;

sensible indicating means connected to said microprocessor and operated in response to said sensible control signal to provide a sensible signal;

said keypad being operated in reponse to said sensible signal to provide a plurality of pairs of row and column signals representative of a keypad signaled password;

said microprocessor being further operated in response to said keypad signaled password to retrieve said stored password from said memory and to compare said keypad signaled password to said stored password;

said microprocessor being further operated in response to a comparison thereof to cause said toll restriction bit to have a value of said second characteristic.

2. A toll restriction circuit as claimed in claim 1, wherein said microprocessor is operated in response to simultaneous depression of plurality of predetermined keypad pushbuttons to provide said sensible control signal.

3. A toll restriction circuit as claimed in claim 1, wherein: said memory is further operated to store a password;

said microprocessor being further operated in response to prolonged depression of a predetermined keypad pushbutton for a predetermined time to provide a first sensible control signal; and sensible indicating means connected to said microprocessor and operated in response to said first sensible control signal to provide a first sensible signal;

said keypad being operated in response to said first sensible signal to provide a plurality of pairs of row and column signals representative of a first keypad signaled password;

said microprocessor being further operated in response to said first keypad signaled password to retrieve said stored password from said memory and to compare said first keypad signaled password to said stored password;

said microprocessor being further operated in response to comparison thereof to provide a second sensible control signal;

said sensible indicating means being operated in response to said second sensible control signal to provide a second sensible signal;

said keypad being operated in response to said second sensible signal to provide a second keypad signaled password;

said microprocessor being further operated in response to said second keypad signaled password to store said second keypad signaled password in said memory at the location of said stored password, whereby said stored password is updated to have the value of said second keypad signaled password.

4. A toll restriction circuit as claimed in claim 1, wherein: said memory is further operated to store a password;

said microprocessor being further operated in response to prolonged depression of a predetermined keypad pushbutton for a predetermined time to provide a first sensible control signal; and sensible indicating means connected to said microprocessor and operated in response to said first sensible control signal to provide a first sensible signal;

said keypad being operated in response to said first sensible signal to provide a plurality of pairs of row and column signals representative of a first keypad signaled password;

said microprocessor being further operated in response to said first keypad signaled password to retrieve said stored password from said memory and to compare said first keypad signaled password to said stored password;

said microprocessor being further operated in response to comparison thereof to provide a second sensible control signal;

said sensible indicating means being operated in response to said second sensible control signal to provide a second sensible signal;

said keypad being operated in response to said second sensible signal to provide a second keypad signaled password;

said microprocessor being further operated in response to said second keypad signaled password to provide a third sensible control signal;

said sensible indicating means being operated in response to said third sensible control signal to provide a third sensible signal;

said keypad being operated in response to said third sensible signal to provide a third keypad signaled password;

said microprocessor being further operated to compare said second and third keypad signaled passwords;

said microprocessor being further operated in response to a comparison thereof to store the value of said second password in said memory, at the location of said stored password, whereby said stored password is updated to have the value of said second keypad signaled password.

5. A toll restriction circuit as claimed in claim 1, wherein: said memory is further operated to store a password;

said microprocessor being further operated in response to prolonged depression of a predetermined keypad pushbutton for a predetermined time to provide a first sensible control signal; and sensible indicating means connected to said microprocessor and operated in response to said first sensible control signal to provide a first sensible signal;

said keypad being operated in reponse to said first sensible signal to provide a plurality of pairs of row and column signals representative of a first keypad signaled password;

said microprocessor being further operated in response to said first keypad signaled password to retrieve said stored password from said memory and to compare said first keypad signaled password to said stored password;

said microprocessor being further operated in response to comparison thereof to provide a second sensible control signal;

said sesible indicating means being operated in response to said second sensible control signal to provide a second sensible signal;

said keypad being operated in response to said second sensible signal to provide a second keypad signaled password;

said microprocessor being further operated in response to said second keypad signaled password to provide a third sensible control signal;

said sensible indicating means being operated in response to said third sensible control signal to provide a third sensible signal;

said keypad being operated in response to said third sensible signal to provide a third keypad signaled password;

said microprocessor being further operated in response to a comparison thereof to store the value of said second password in said memory, at the location of said stored password whereby said stored password is updated to have the value of said second keypad signaled password;

said microprocessor being further operated in response to miscomparison of said second and third keypad signaled passwords to provide a fourth sensible control signal, said sensible indicating means being operated in response to said fourth sensible control signal to provide a fourth sensible signal;

said keypad being operated in response to said fourth sensible signal to provide a fourth keypad signaled password;

said microprocessor being further operated to compare said second and fourth keypad signaled passwords;

said microprocessor being further operated in response to a comparison thereof to store the value of said second password in memory at the location of said stored password, whereby said stored password is updated to have the value of said second keypad signaled password.

6. A toll restriction circuit as claimed in claim 1, wherein: said toll call identifying digit is a "0".

7. A toll restriction circuit as claimed in claim 1, wherein: said to call identifying digit is a "1".

8. A toll restriction circuit as claimed in claim 1, wherein: said memory is operated to store a plurality of toll call identifying digits, said microprocessor being operated to retrieve each of said toll call identifying digits, to compare said pushbutton digit to each of said toll call identifying digits and to provide said enable signal only if there is a miscomparison between said pushbutton digit and each toll call identifying digit, and to provide said disable signal if there is a comparison between said pushbutton digit and any toll call identifying digit.

9. A toll call restriction circuit as claimed in claim 8, wherein: said toll call identifying digits are "0" and "1".

10. A toll call restriction circuit as claimed in claim 1, wherein:

said microprocessor is further operated in response to said toll restriction bit having said first characteristic to sequentially provide a plurality of sensible control signals of predetermined duration; said toll restriction circuit further comprising an audible transducer, operated in response to said sensible control signals to provide a corresponding plurality of audible "beep" tones.

11. A toll restriction circuit as claimed in claim 1, wherein said memory is operated to store a toll restricted message, said toll restriction circuit further comprising visual character display means, said microprocessor being further operated in response to said toll restriction bit having said first characteristic to retrieve said toll restriction message from said memory and apply it to said visual display means which is operated to display said toll restricted message.

12. A toll restriction circuit as claimed in claim 1, wherein: said memory is operated to store a toll restricted message, and said toll restriction circuit further comprises an audible transducer and visual character display means, said microprocessor being further operated in response to said toll restriction bit having said first characteristic to sequentially provide a plurality of sensible control signals of predetermined duration and to retrieve said toll restriction message from said memory and apply it to said visual character display means which is operated to display said toll restriction message, said audible transducer being operated in response to said sensible control signals to provide a corresponding plurality of audible "beep" tones.

13. A toll call restriction circuit as claimed in claim 2, wherein said sensible indicating means comprises an audible transducer operated in response to said sensible control signal to provide an audible "beep" tone.

14. A toll restriction circuit as claimed in claim 2, wherein: said memory is further operated to store an enter password message, and said sensible indicating means comprises visual character display means said microprocessor being operated in response to said simultaneous depression of plurality of predetermined keypad pushbuttons to retrieve said enter password message from said memory and apply it to said visual character display means, whereby said enter password message represents said sensible control signal, said visual character display means being operated to display said enter password message.

15. A toll call restriction circuit as claimed in claim 2, wherein: said sensible indicating means comprises an audible transducer and a visual character display means and said memory is further operated to store an enter password message, said microprocessor being further operated in response to said simultaneous depression of a plurality of predetermined keypad buttons to provide an audible control signal and to retrieve said enter password message from said memory and apply it to said visual character display means, whereby said enter password message and said audible control signal respresent said sensible control signal, said visual character display means being operated to display said enter password message and said audible transducer being operated in response to said audible control signal to provide an audible "beep" tone.

16. A toll restriction circuit as claimed in claim 3, wherein: said sensible indicating means comprises an audible transducer, operated in response to said first and second sensible control signals to provide first and second audible "beep" tones.

17. A toll restriction circuit as claimed in claim 3, wherein: said sensible indicating means comprises visual character display means and said memory is operated to store enter password and new password messages and said microprocessor is operated in response to said prolonged depression of a predetermined keypad pushbutton for a predetermined time to retrieve said enter password message from said memory and apply it to said visual character display means, and further operated in response to comparison of said first keypad signaled password and said stored password to retrieve said new password message and apply it to said visual character display means, whereby said enter password and new password messages represent said first and second sensible control signals;

said visual character display means being operated to display said enter password and new password messages.

18. A toll restriction circuit as claimed in claim 3, wherein said sensible indicating means comprises an audible transducer and visual character display means, and said memory is further operated to store enter password and new password messages, said microprocessor being operated in response to said prolonged depression of a predetermined keypad pushbutton for a predetermined time to provide a first audible control signal and to retrieve said enter password message from said memory and apply it to said visual character display means, whereby said first audible control signal and said enter password message respresent said first sensible control signal;

said audible transducer being operated in response to said first audible control signal to provide a first audible "beep" tone and said visual character display means being operated to display said enter password message;

said microprocessor being further operated in response to comparison of said first keypad signaled password and said stored password to provide a second audible control signal and to retrieve said new password message from said memory and apply it to said visual character display means, whereby said second audible control signal and said new password message represent said second sensible control signal;

said audible transducer being operated in response to said second audible control signal to provide a second audible "beep" tone and said visual character display means being operated to display said new password message.

19. A toll restriction circuit as claimed in claim 4 wherein: said sensible indicating means comprises an audible transducer, operated in response to said first, second and third sensible control signals provide first, second, and third audible "beep" tones.

20. A toll restriction circuit as claimed in claim 4, wherein: said sensible indicating means comprises visual character display means and said memory is operated to store enter password, new password and reenter password messages and said microprocessor being operated in response to said prolonged depression of a predetermined keypad pushbutton for a predetermined time to retrieve said enter password message from said memory and apply it to said visual character display means and further operated in response to said comparison of said first keypad signaled password and said stored password to retreive said new password message from said memory and apply it to said visual character display means and further operated in response to receipt of said second keypad signaled password to retrieve said reenter password message from said memory;

said visual character display means being operated in response to display said enter password, new password and reenter password messages.

21. A toll restriction circuit as claimed in claim 4, wherein: said sensible indicating means comprises an audible transducer and visual character display means, and said memory is further operated to store enter password, new password and reenter password messages, said microprocessor being operated in response to said prolonged depression of predetermined keypad pushbutton for a predetermined time to provide a first audible control signal and to retrieve said enter password message from said memory and apply it to said visual character display means, whereby said first audible control signal and said enter password message represent said first sensible control signal;

said audible transducer being operated in response to said first audible control signal to provide a first audible "beep" tone and said visual character display means being operated to display said enter password message;

said microprocessor being further operated in response to comparison of said first keypad signaled password and said stored password to provide a second audible control signal and to retrieve said new password message from said memory and apply it to said visual character display means, whereby said second audible control signal and said new password message represent said second sensible control signal;

said audible transducer being operated in response to said second audible control signal to provide a second audible "beep" tone and said visual character display means being operated to display said new password message, said microprocessor being further operated in response to receipt of said second keypad signaled password to provide a third audible control signal and retrieve said reenter password message from said memory and apply it to said visual character display means, whereby said third audible control signal and said reenter password message represent said third sensible control signal;

said audible transducer being operated in response to said third audible control signal to provide a third audible "beep" tone and said visual character display means being operated to display said reenter password message.

* * * * *